United States Patent [19]

McClain et al.

[11] 4,007,075
[45] Feb. 8, 1977

[54] METHOD OF MAKING A FIBERGLASS POLE

[75] Inventors: Stephen A. McClain, Puyallup; Harvey A. Doman, Tacoma; Richard D. Entus, Gig Harbor, all of Wash.

[73] Assignee: Cascade Pole Company, Tacoma, Wash.

[22] Filed: June 16, 1975

[21] Appl. No.: 587,127

Related U.S. Application Data

[60] Continuation of Ser. No. 422,994, Dec. 10, 1973, abandoned, which is a division of Ser. No. 298,028, Oct. 16, 1972, Pat. No. 3,813,837.

[52] U.S. Cl. ............................ 156/62.2; 156/154; 156/190; 156/191; 156/192; 156/194; 156/195; 156/221; 156/289; 156/297; 427/203; 427/355; 427/407 C; 427/416
[51] Int. Cl.² ................... B31C 3/00; B65H 81/08
[58] Field of Search .......... 156/189, 190, 191, 192, 156/194, 195, 289, 62.2, 154, 221, 297; 138/145, 150, 154, DIG. 8, DIG. 11; 52/28, 738; 428/36; 427/203, 355, 407 C, 416

[56] References Cited

UNITED STATES PATENTS

| | | | |
|---|---|---|---|
| 3,202,560 | 8/1965 | Michael | 156/194 |
| 3,301,727 | 1/1967 | Verrell et al. | 156/189 |
| 3,655,468 | 4/1972 | Bastone et al. | 156/189 |
| 3,676,246 | 7/1972 | Grosh | 156/190 |
| 3,709,754 | 1/1973 | Medler | 156/195 |
| 3,813,837 | 6/1974 | McClain et al. | 52/28 |

*Primary Examiner*—Charles E. Van Horn
*Assistant Examiner*—Basil J. Lewis
*Attorney, Agent, or Firm*—Graybeal, Barnard & Uhlir

[57] ABSTRACT

A hollow resin bonded glass fiber column of unique cross section suitable for use as a utility pole, light standard or the like is disclosed including unique means for forming the pole. A rotatable finned mandrel is wrapped with a waxed surfaced paper and then sprayed with a mixture of chopped glass, resin and catalyst which is initially pressed thereon by a roller and then wrapped with continuous bands of fiberglass roving, re-rolled, covered with a fiberglass veil, rolled again and allowed to cure. The finned mandrel which makes relatively thin line contact with the inside of the pole and the wax surfaced paper allows the curved pole to be easily slipped endwise from the mandrel. In one embodiment a metal mandrel having eight radially extending fins has been successfully used to form fiberglass poles of octagonal cross section. The intermittent pressing and rolling of the resin and glass on the mandrel during formation produces a pole having eight angularly distinct surface panels with planar outer surfaces and inner surfaces which are arcuately bowed toward the center of the pole such that the thickness of each of the panels varies across its width to provide an exceptionally strong pole. Base members and lateral support arms for use in conjunction with the poles are also disclosed.

9 Claims, 7 Drawing Figures

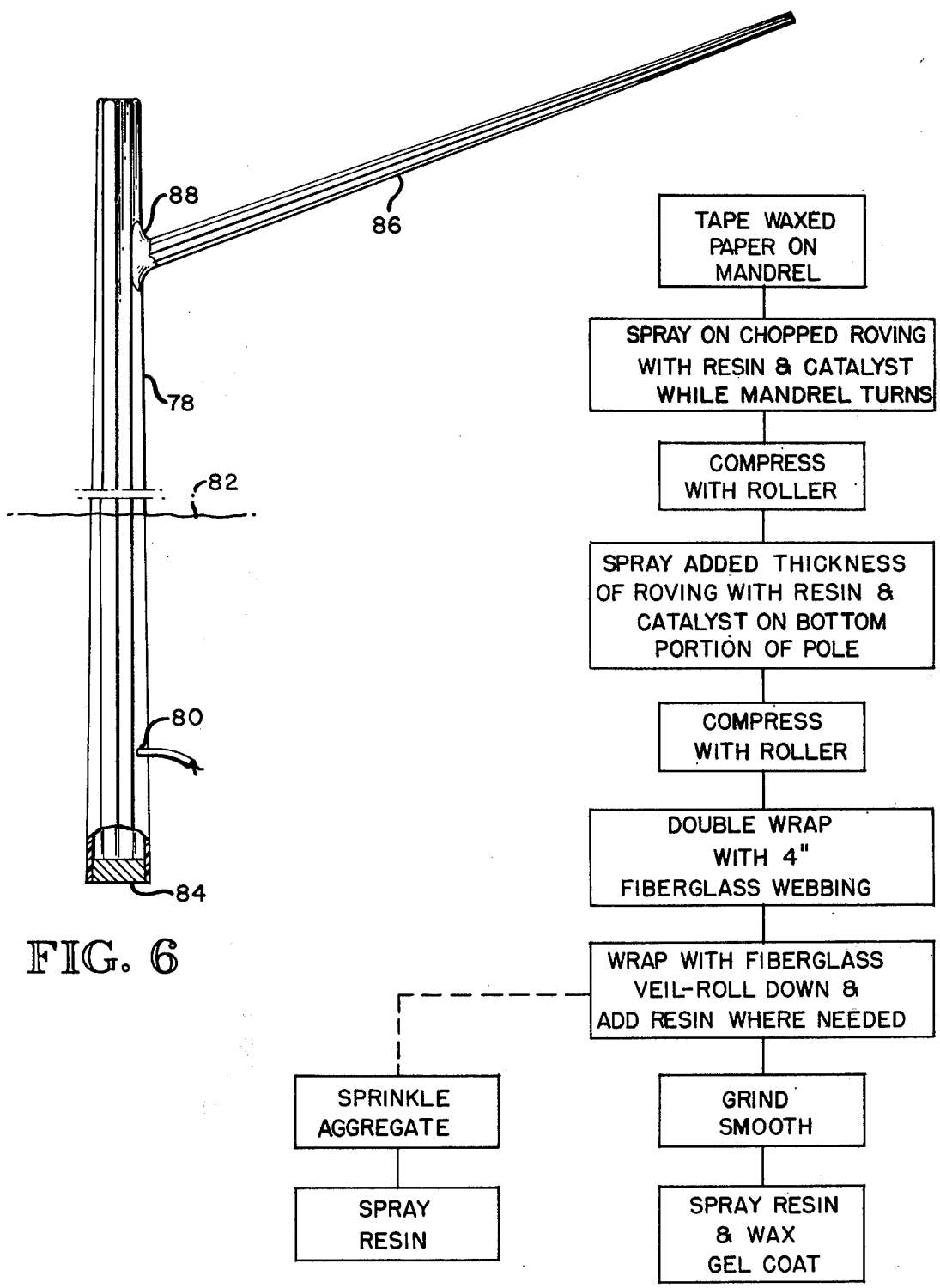

METHOD OF MAKING A FIBERGLASS POLE

This is a continuation of application Ser. No. 422,994, filed Dec. 10, 1973, now abandoned, which application is a division of application Ser. No. 298,028, filed on Oct. 16, 1972 and which issued as U.S. Pat. No. 3,813,837 on June 4, 1974.

BACKGROUND OF THE INVENTION

1. Field of the Invention

This invention relates, in general, to resin bonded glass fiber columns suitable for use as utility poles, light standards or the like and their method of fabrication, and in particular, to poles of unique cross sectional shape and the method of forming these poles on a removable finned mandrel to produce an exceptionally light but strong pole.

2. Description of the Prior Art

At present, most lighting standards and utility poles are constructed of wood and thus have the inherent drawbacks associated with wood such as relatively rapid deterioration from exposure to the elements and great weight which make the poles difficult to install and replace. Wooden core poles sheathed with fiberglass and thus having substantially increased useful life are known, such as shown for example in U.S. Pat. No. 3,562,403, as are hollow fiberglass poles formed on a non-removable mandrel such as a cardboard tube as shown in U.S. Pat. No. 2,870,793. Further, the broad concept of continuously wrapping resin coated glass fibers about a mandrel, allowing the resin to at least partially cure and then removing the mandrel to form continuous piping or tubing is also known as shown by U.S. Pat. Nos. 3,407,101 and 3,522,122, as is the practice of making individual pieces of plastic pipe in a similar manner as shown for example in U.S. Pat. Nos. 2,614,058 and 3,470,917.

These patents disclose the production of relatively flexible tubular structures unsuitable for use as light standards or utility poles, and of relatively short structures which may be removed from their internal mandrels without the substantial difficulty encountered in the fabrication of long fiberglass poles in this manner. Most resins used to bond fiberglass shrink upon curing and thus it will be understood that a long fiberglass column allowed to cure on a cylindrical mandrel can present a very difficult removal problem. Releasing agents such as polyvinyl alcohol have been used to coat a mandrel prior to covering it with fiberglass as set forth in U.S. Pat. No. 3,429,758 but the effectiveness of these releasing agents has been found to be less than satisfactory where a chopped glass and resin mixture is sprayed on a mandrel of substantial length. Additionally in the past, it has not been possible to construct an all fiberglass pole of sufficient length to serve successfully as a light standard or utility pole which was strong enough to withstand the wind loading and the like expected to be encountered in common use without either employing a rigid central core of some type about which the fiberglass was laid, wrapped or sprayed or sandwiching a core material such as plastic foam between two layers of glass roving such as shown in U.S. Pat. No. 3,429,758.

SUMMARY OF THE INVENTION

This invention relates to light standards and utility poles of substantial length formed by the application of successive layers of resin impregnated glass fibers on a unique form of mandrel to overcome the mandrel removal problem common to all previous attempts to form long fiberglass columns on a mandrel and to form a column of unique cross section which has exceptional structural strength advantages over known poles such that a relatively thin fiberglass pole may successfully withstand the heavy loads encountered in use as a light standard or utility pole. In particular, the pole of the instant invention is formed on a wax paper wrapped finned mandrel thereby substantially reducing the contact points between the inner surface of the pole and the mandrel to the thin longitudinal edges of the mandrel fins. Fabrication of the pole on a finned mandrel further produces a pole having a plurality of relatively flat longitudinally extending external surfaces joined to each other long edge to long edge and having substantially increased structural strength for the reason that the inner surface of each planar section is curved arcuately inward such that the inner walls of the pole might be said to have a "reverse fluted" or "scalloped" configuration.

It is an object of the present invention, therefore, to provide a long fiberglass column, suitable for use as a light standard or the like, having a regular polygonal cross section.

One more object of this invention is to provide a long fiberglass column, suitable for use as a light standard or the like having walls differing regularly in cross sectional thickness.

Another object is to provide an all fiberglass light standard formed on a removable mandrel having an octagonal cross section.

Still another object of the instant invention is to provide a fiberglass light standard formed on a finned mandrel.

One more object of the instant invention is to provide a method of forming a fiberglass light standard on a rotating finned mandrel and removing the light standard from the mandrel after curing of the fiberglass.

Still another object is to provide a mandrel having a central core and a plurality of longitudinal fins extending radially outward therefrom for use in constructing a long fiberglass column.

An additional object of the present invention is to provide an all fiberglass column having relatively thin sidewalls which is sufficiently strong for use as a light standard or utility pole.

One more object is to provide an all fiberglass column having an internal cross sectional configuration differing in shape from its external cross sectional configuration and wherein the differences between said configurations provide said column with substantial structural strength.

Other and additional advantages will be apparent from the following description taken in conjunction with the accompanying drawings.

BRIEF DESCRIPTION OF THE DRAWINGS

FIG. 6 is a partial elevation view of a light standard constructed according to the teachings of the instant invention including an integral light standard support arm extending laterally outward therefrom and an internal structural reinforcing plug mounted in the base of the pole.

FIG. 7 is a block diagram illustrating a typical method of fabricating a fiberglass pole on a finned mandrel in accordance with the instant invention.

DETAILED DESCRIPTION OF THE INVENTION

Figure 1:
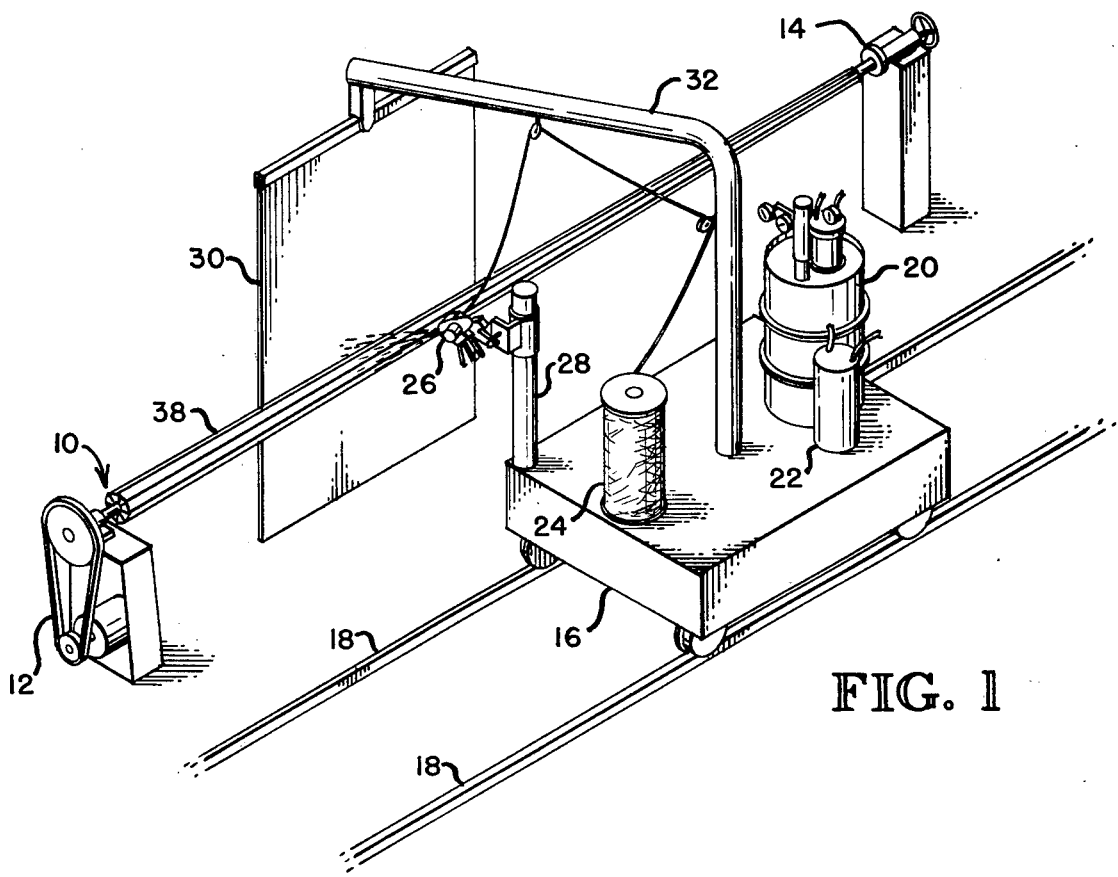
FIG. 1 is a schematic view of typical apparatus suitable for use in fabricating a fiberglass pole according to the instant invention.

Referring initially to FIG. 1, a typical setup suitable for fabricating an all fiberglass pole on a finned mandrel according to the teachings of the instant invention is disclosed including a finned mandrel 10 mounted longitudinally to extend between rotatable chuck portions 12 and 14. Cart 16 moves parallel finned mandrel 10 on tracks 18 and carries conventional fiberglass forming equipment including resin tank 20, catalyst tank 22, acetone tank 23, and glass roving 24 interconnected to mixing gun 26 by conventional hosing. Mixing gun 26 is of a known type capable of chopping the glass roving and spraying it together with the resin onto the mandrel. A resin such as Polylite No. 33-049 sold by Reichold Chemicals, Inc. has been successfully used to bind the chopped glass to produce a satisfactorily strong pole. Mixing gun 26 is mounted on pole support 28 while shield 30 is supported on cantilevered arm 32 rearwardly of the mandrel to catch the resin impregnated fiberglass sprayed past the mandrel.

Various combinations of cart speed and mandrel rotation speed may be used during application of the fiberglass to the mandrel, but it has been found that satisfactory results may be achieved by rotating the mandrel at a speed of 38 revolutions per minute while varying the speed of the cart to allow the chopped fiberglass to be deposited to a desired thickness, it being understood that where mandrel 10 is tapered from end to end relatively slower cart speeds are required near the base of the pole where the pole surface area is greater.

Figure 2:
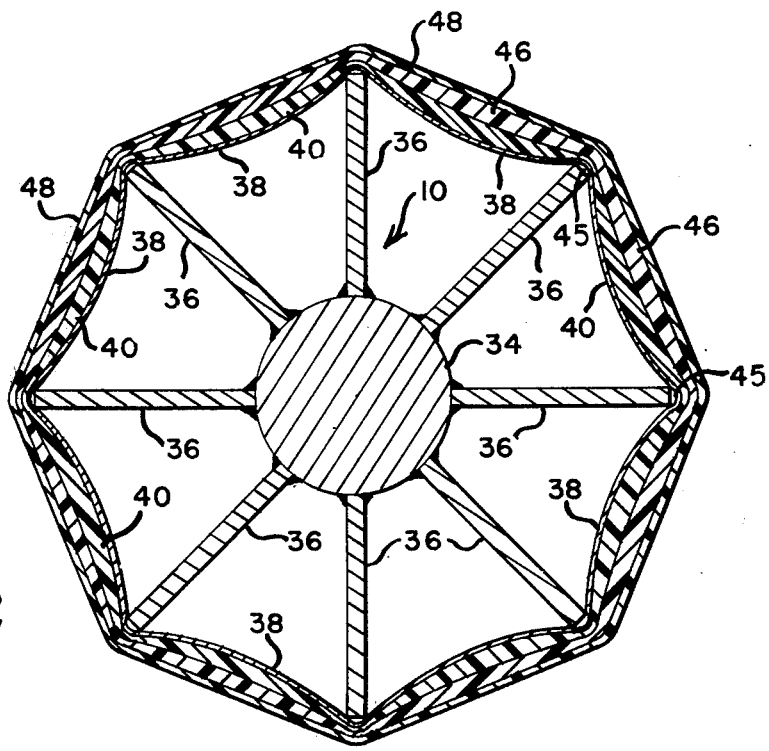
FIG. 2 is a sectional view of a typical fiberglass pole made according to the instant invention shown mounted on a paper covered finned mandrel.

Referring additionally to FIG. 2, finned mandrel 10 is shown to include a central rod or pipe portion 34 having eight longitudinal fins 36 extending radially outward therefrom. Mandrel 10 may be easily fabricated from metal such as steel, but it is also contemplated that wood or any other rigid material could be substituted therefor and that varying numbers of longitudinal fins could be provided on the mandrel to produce poles having a like number of longitudinal surfaces without straying from the contemplated scope of this invention. For example, a four finned metal mandrel has been successfully used to form a pole having a rectangular cross section.

Figure 3:
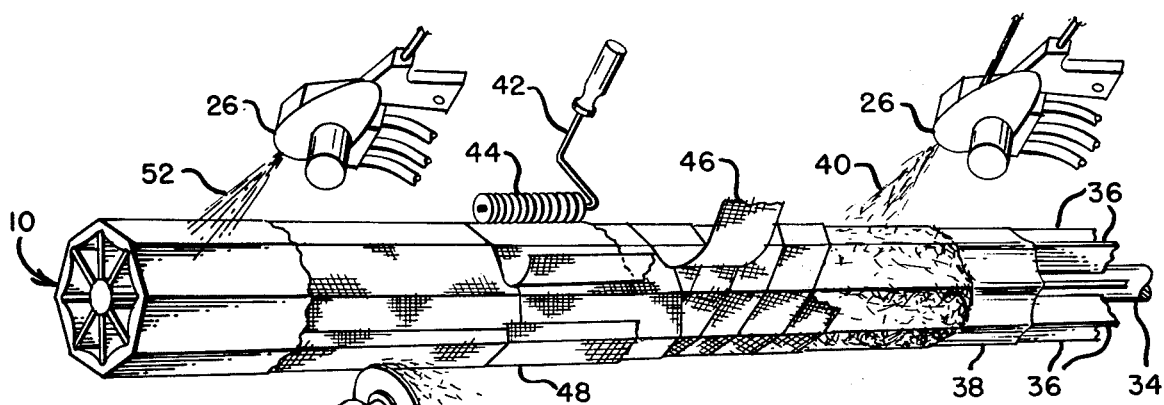
FIG. 3 is a schematic view illustrating a typical method of fabricating a fiberglass pole on a finned mandrel.

Referring now to FIGS. 3 and 6, one method of forming an all fiberglass pole in accordance with this invention will be discussed. After mounting finned mandrel 10 in its rotatable chuck, a wrapping of waxed paper 38, such as the commonly known "butcher paper" for example, is placed on the fins of mandrel 10 and held thereon by any convenient means such as tape. If the paper is waxed on only one surface, the waxed surface is placed adjacent the fins of the mandrel. When the mandrel is completely covered with the waxed paper, motor 39 is turned on and the chopped fiberglass mixture 40 is sprayed onto the rotating mandrel to a depth which may vary, prior to rolling, from between one-half inch to one inch or more. During spraying, a hand roller 42 preferably having a grooved metal roll 44 is pressed against the sprayed on fiberglass mixture to compress and spread it evenly on the mandrel and to prevent its falling therefrom. As the roller is held against the rotating mandrel under light pressure, it rides up over each of the fins of the mandrel before dropping into the next between fin valley, and the pole thus begins to take on what might be termed an octagonal "fluted" shape as opposed to the generally circular shape resulting immediately after the fiberglass is sprayed on the mandrel. The inward bowing of the paper between the mandrel fins under the pressure of the roller is in part the result of slack in the paper remaining after it is taped onto the mandrel, although it is possible that the tape holding the paper on the mandrel also slips or that the paper itself sags a bit under pressure after it has been wet by the resin, but in any event, paper wrapping 38 begins to assume the inwardly arcuate bow between the mandrel fins which gives the inside of the completed pole its unique reverse "fluted" effect and strengthens the pole such that it can withstand loads substantially beyond those which could be carried by a comparably sized fiberglass cylinder having circularly concentric inner and outer surfaces. It should be understood that the paper wrapping on the mandrel is intentionally left a bit loose during taping in order to allow the paper to curve gently around the fins of the mandrel as at 45 in FIG. 2 for increased strength. It has been found that if the paper is pulled tightly around the mandrel such that it conforms to the flat outer edge of the mandrel fin weak points are formed in the pole along the relatively sharp lines at the corner edges of the mandrel fins along which the pole is likely to fracture under stress. The illustrated rounded corners, however, have been found to approximate the strength of the relatively thick central portions of the longitudinal wall sections shown in that the poles do not exhibit any substantially greater tendency to break at the corners rather than at other points on their surfaces, and in any event not until after loading substantially above that which the pole must be able to support for effective use. In effect, therefore, the pole illustrated in FIG. 2 is substantially equal in strength to a pole having a uniform wall thickness equal to the thickest portion of the wall sections shown, while requiring substantially less resin and therefore providing a significant cost advantage.

Figure 5:
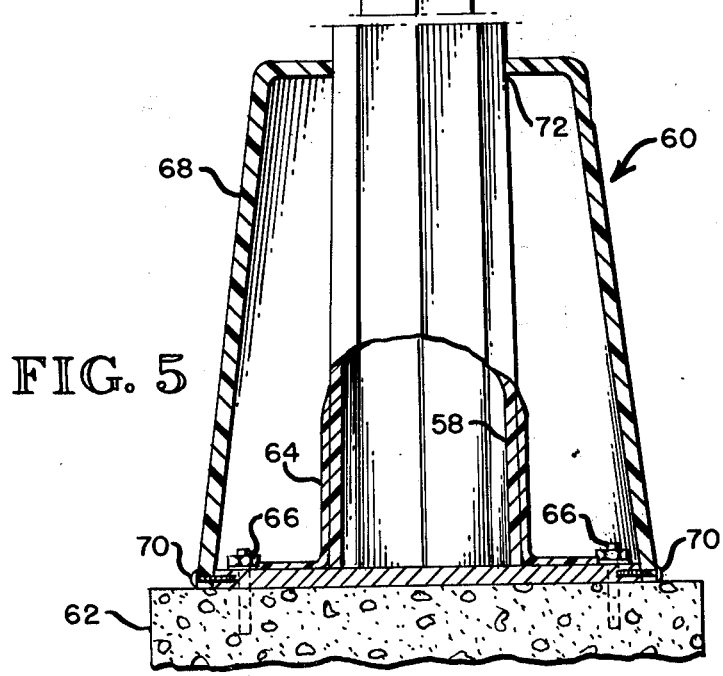
FIG. 5 is a partial sectional view of a light standard made according to the instant invention including a typical base mount and light fixture mount.

A double layer of chopped fiberglass mixture is normally sprayed adjacent the bottom of the pole where the bending moments caused by wind loads or the like after the pole has been mounted in the earth or on a base member of the type to be described hereafter with reference to FIG. 5, are greatest. Rolling of the fiberglass with the grooved roller 44 tends to work the resin in the mixture sprayed onto the mandrel to the top so that all of the fiberglass is saturated.

While continuing to rotate the mandrel at the constant 38 rpm speed, the fiberglass mixture is wrapped with a continuous overlapping covering of fiberglass tape 46. In one embodiment, a seven ounce tape having a square weave has been used to produce a satisfactorily strong pole, however, tapes up to nine ounces may also be used for added strength. The overlapping tape is wrapped on an approximately 45° bias with respect to the pole from bottom to top and then a second tape layer, biased at approximately 90° with respect to the first, is wrapped continually from top to bottom. The fiberglass tape is wrapped tightly around the chopped glass and resin mixture on the mandrel such that the resin is squeezed through the tape itself to set it. The tape is additionally rolled to level out any bumps which have formed beneath the tape, to work the resin to the surface to wet the tape and to further shape the inwardly curving inner surfaces of pole between the fins of the mandrel.

Rotation of the mandrel is stopped while sheets of fiberglass veil 48 are laid on the wet surface of the tape, and rolled into the resin. It will be understood that if the tape is too dry, additional resin may be sprayed thereon. In practice, a ten mill swirl veil of fiberglass has been used to produce a pole having a satisfactorily smooth surface.

The pole is now allowed to dry and cure, and when dry any surface bubbling may be ground off with a conventional grinder 50. A principal purpose of the veil covering is to protect the continuous tape windings therebeneath during finish grinding, it being understood that the veil itself may be substantially ground off if necessary to smooth the surface of the pole without significantly weakening the pole. Damage to the fiberglass tapes wrapped therebelow, however, would substantially weaken the pole and thus should be avoided. A final gel coat of resin 52 containing a small amount of wax may then be sprayed on the smoothed and ground pole to produce a shiny finished surface. It should be understood that through this application, the term "resin" is taken to include a resin and catalyst mixture of the type commonly used in chopped fiberglass spraying.

Figure 4:
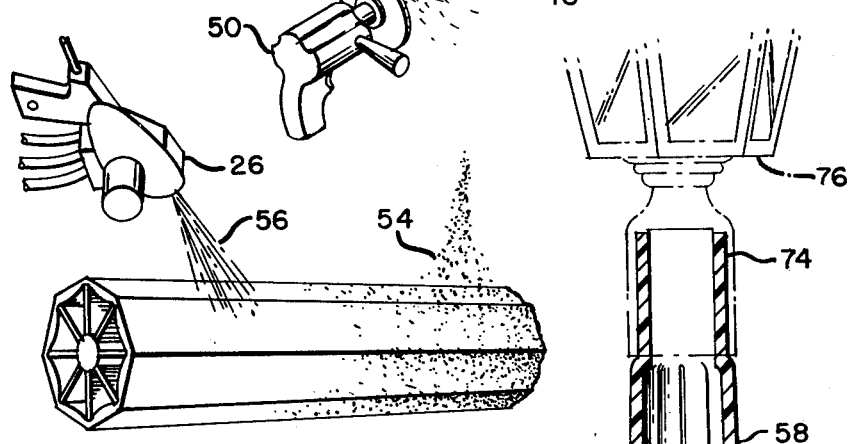
FIG. 4 is a schematic view similar to that of FIG. 3 illustrating typical additional steps in fabricating a fiberglass pole on a finned mandrel.

A method of producing a roughened surface finish is disclosed after grinding, in FIG. 4 where the pole is again sprayed with resin and a coating such as sand 54, ground quartz or any other suitable aggregate material sprinkled thereon. A final coating of resin 56 may then be sprayed on the pole to hold the aggregate thereon.

To remove the pole from the mandrel, one end of the mandrel is loosened from its rotating drive chuck and the end of the mandrel itself is moved sharply longitudinally against a stationary surface while the pole is held to cause the pole to pop free. Where a tapered mandrel is employed it will be understood that the small end of the mandrel is moved sharply against the stationary surface. The use of a finned mandrel rather than a mandrel contacting the inside of the pole at all points, in combination with the waxed paper, mandrel covering makes removal of the cured pole from the mandrel a simple task compared to prior art techniques.

Referring now to FIG. 5, a completed all fiberglass pole 58 having an octagonal external cross section and being tapered inwardly at the rate of one quarter inch per foot from its base to its top portion is disclosed mounted in a fiberglass base member generally indicated at 60 suitable for use where it is not desired to implant the fiberglass pole directly into the ground. In this mounting configuration, a concrete pad 62 is laid on which a collar 64 is bolted by means of conventional bolts 66. As disclosed, collar 64 is octagonal in internal cross section and has an inside diameter substantially equal in size to the outside diameter of the base of pole 58 such that the pole slips downwardly therein. Base member 60 further includes upstanding box portion 68 which is connected by fasteners 70 to collar 64 and which includes an octagonal opening 72 in its top surface through which hole 58 may be slipped.

As stated heretofore, the wall thickness of the pole may vary along its length, a typical twenty foot pole having a minimal top wall thickness of 3/16 inch at the thick midpoint between mandrel creases and a ⅛ inch thickness at the thin mandrel creases and corresponding base wall thicknesses of approximately ⅜ inch and 3/16 inch respectively. Of course, these poles may be easily fabricated with a thicker wall dimension to provide a stronger pole if desired.

The pole of FIG. 5 further includes a narrow top neck 74 on which a conventional light fixture 76 is shown mounted. Normally, the top diameter of pole 58 is the standard 2⅜ inch O.D. dimension commonly used in the lighting industry while the bottom diameter of the poles will vary depending on the length of the pole, a twenty foot pole having a seven and one-half inch base diameter, for example. In another embodiment, the pole may be provided with a 2⅜ inch O.D. metal top neck, the bottom portion of which is fiberglassed directly into the pole so that the metal fitting is permanently mounted thereon.

Referring now to FIG. 6, a fiberglass pole 78 fabricated on a finned mandrel in accordance with the teachings of this invention is shown mounted directly in the ground. At present, a large percentage of outdoor lighting is mounted on 25 foot standards, and it is contemplated that a thirty foot pole fabricated on a finned mandrel in the manner described heretofore could be satisfactorily mounted to extend into the ground approximately 5 feet. A 2 inch diameter hole 80 may be provided approximately 2 feet below ground line 82 for the entrance of wiring into the poles.

As will be understood, bending forces, such as those caused by wind load, exerted on the pole near its top are transmitted downwardly toward the bottom of the pole. To reinforce the bottom of the pole, a plug 84 is shown inserted within its open bottom end. In one form of the invention, plug 84 has been formed of urethane foam having a thickness of about two inches and the plug is press fit into the generally octagonal bottom of the pole 78 to reduce the possibility of the pole itself fracturing or cracking. A final fiberglass and resin layer is preferably applied over the entire bottom of the pole and plug for added strength and to hold the plug in place.

It is additionally contemplated that a substantial longitudinal portion of a completed pole may be filled with urethane foam or the like in order to additionally strengthen the pole. The addition of a foam of this type is considered to be particularly desirable in the construction of long poles over thirty feet in length which must bear substantial wind loads.

FIG. 6 further illustrates a generally transverse luminaire support arm 86 which also may be formed in the manner described above on a finned mandrel and then mounted at 88 on one side of pole 78 by conventional fiberglass laying techniques. Since both the pole 78 and support arm 86 are hollow, electrical conduit powering a light mounted thereon may be easily strung therewithin through a small hole provided in the sidewall of pole 78.

From all of the above, it will be understood that fiberglass poles of varying length, cross sectional dimensions and tapers may be formed in the manner described depending on the size and configuration of the finned mandrel chosen. While this application has disclosed the construction of columns of octagonal cross section it will be understood that mandrels having a lesser or greater number of radially extending fins may be employed to fabricate columns having a corresponding number of planar outer surfaces. The curvature of the inner faces of the planar surfaces may be varied depending on the roller pressure applied to the mandrel during fabrication and the tightness of the waxed paper originally taped to the mandrel as discussed heretofore, and thus poles of varying strength may be produced as desired. It has been found that the wax paper may be removed from within a completed pole, if desired, by loosening and gripping a portion thereof near one end of the pole and twisting it to pull the paper completely from the inner wall of the pole.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method of making a fiberglass pole of integral multi-sided cross section by spraying a mixture of chopped glass, resin and catalyst on a rotating mandrel, wrapping said mixture with one or more layers of fiberglass webbing, allowing said fiberglass to cure and removing said pole from said mandrel, the improvement comprising:
   initially mounting a mandrel having a center shaft and a plurality of longitudinal fins equal in number to the cross-sectional sides of the pole to be formed extending radially outward therefrom in a rotatable chuck;
   loosely wrapping said finned mandrel with a thin sheet of paper such that the inner surface of said paper lightly overlies the fins of said mandrel; and,
   pressing said sprayed on chopped glass, resin and catalyst mixture and said webbing onto said finned mandrel with rollers to deform said thin sheet of paper such that said paper and said mixture bow inwardly between said fins such that the cross sectional wall thickness of the finished pole varies regularly about its perimeter.

2. The method of claim 1 including the step of pressing said sprayed on chopped glass, resin and catalyst mixture with rollers to deform said thin sheet of paper prior to wrapping said mixture with fiberglass webbing.

3. The method of claim 1 wherein the step of spraying said mixture of chopped fiberglass, resin and catalyst on said mandrel includes the step of spraying a double thickness of said mixture for a distance from the bottom of said pole to increase its strength.

4. The method of claim 1 including the steps of covering said fiberglass wrappings with pieces of fiberglass veil; rolling said veil to remove lumps from the surfaces of said pole; allowing said pole to cure and grinding the surface of said pole smooth.

5. The method of claim 4 including the additional step of spraying said ground pole with a resin and wax mixture to give said pole a luster.

6. The method of claim 4 wherein after said veil is rolled said pole is sprinkled with an aggregate material; sprayed with resin and allowed to dry.

7. The method of forming a large diameter pole of polygonal cross section on a mandrel comprising the steps of:
   mounting a mandrel having a plurality of raised longitudinally extending fins in a rotatable chuck;
   loosely wrapping said finned mandrel with a thin sheet of paper such that said paper lightly overlies the fins of said mandrel;
   rotating said paper covered mandrel and spraying a conventional mix of chopped fiberglass roving, resin and catalyst thereon;
   rolling said mixture on said mandrel to reshape said thin sheet of paper such that said paper and said mixture are depressed downwardly between said fins to render the cross sectional wall thickness of the pole greater at points between said fins than at points overlying said fins;
   continuously wrapping said coated mandrel with fiberglass tape to strengthen said pole and to hold said chopped fiberglass thereon;
   rolling said tape to flatten the outer surfaces of the portions of said pole between said fins and further reshape said thin sheet of paper;
   allowing said fiberglass mixture to cure on said mandrel; and
   removing said pole from said mandrel by sliding said mandrel longitudinally therefrom.

8. The method of claim 7 wherein the step of spraying said mixture of chopped fiberglass, resin and catalyst on said mandrel includes the step of spraying a double thickness of said mixture for a distance from the bottom of said pole to increase its strength.

9. The method of claim 7 including the steps of covering said fiberglass wrappings with pieces of fiberglass veil; rolling said veil to remove lumps from the surface of said pole; allowing said pole to cure and grinding the surface of said pole smooth.

* * * * *

UNITED STATES PATENT OFFICE
CERTIFICATE OF CORRECTION

Patent No. 4,007,075                              Dated February 8, 1977

Inventor(s)   Stephen A. McClain et al.

It is certified that error appears in the above-identified patent and that said Letters Patent are hereby corrected as shown below:

Column 5, line 8, change "set" to -- wet --.

Signed and Sealed this

Third Day of May 1977

[SEAL]

Attest:

RUTH C. MASON  
Attesting Officer

C. MARSHALL DANN  
Commissioner of Patents and Trademarks